United States Patent

[11] 3,596,377

| [72] | Inventor | Janet Ballard Abbey<br>Philadelphia, Pa. |
|---|---|---|
| [21] | Appl. No. | 828,577 |
| [22] | Filed | May 28, 1969 |
| [45] | Patented | Aug. 3, 1971 |
| [73] | Assignee | Jerome H. Lacheen<br>a part interest |

[54] EDUCATIONAL TEACHING AND TESTING DEVICE
8 Claims, 7 Drawing Figs.

[52] U.S. Cl. .................................................... 35/22 A
[51] Int. Cl. ..................................................... G09b 19/00
[50] Field of Search ........................................... 35/22, 22.5, 30, 31, 31.4, 31.6, 31.8, 32, 33, 69—72, 73; 273/156; 229/92.9

[56] References Cited
UNITED STATES PATENTS

| 641,739 | 1/1900 | Thompson.................... | 35/30 |
| 2,304,893 | 12/1942 | Dickson ....................... | 35/31 (.4) |
| 2,840,927 | 7/1958 | Hoffmann .................... | 35/32 X |
| 1,764,448 | 6/1930 | Herzfeld....................... | 35/30 X |

FOREIGN PATENTS

| 529,461 | 11/1940 | Great Britain................ | 35/30 |

*Primary Examiner*—Wm. H. Grieb
*Attorney*—Jerome H. Lacheen

ABSTRACT: The method and means for teaching and evaluating the intellectual and perceptual development of children including a board containing a plurality of rows of recesses each capable of receiving a disc therein.

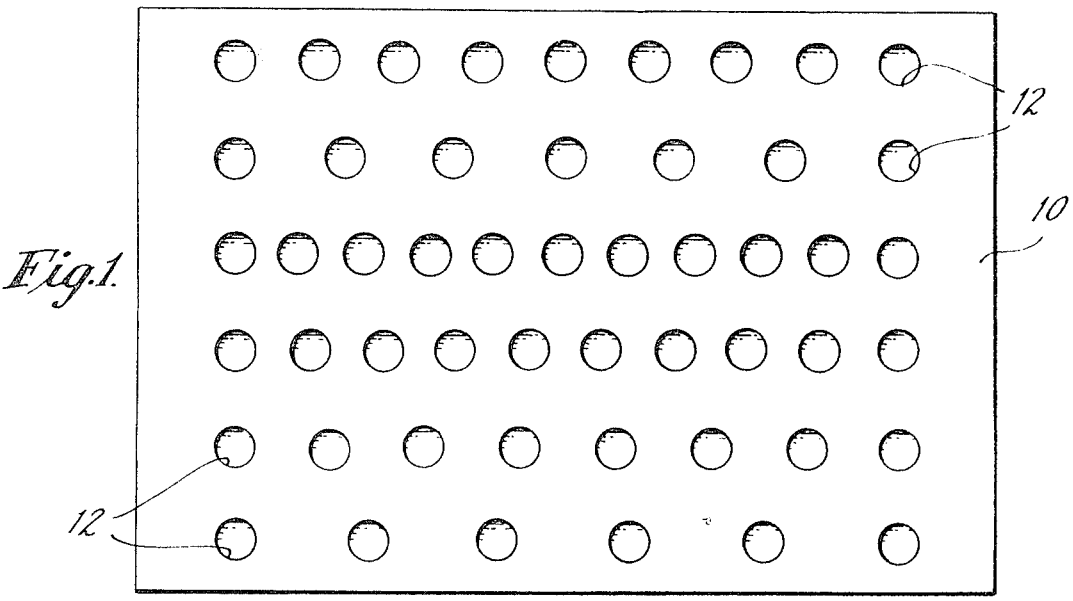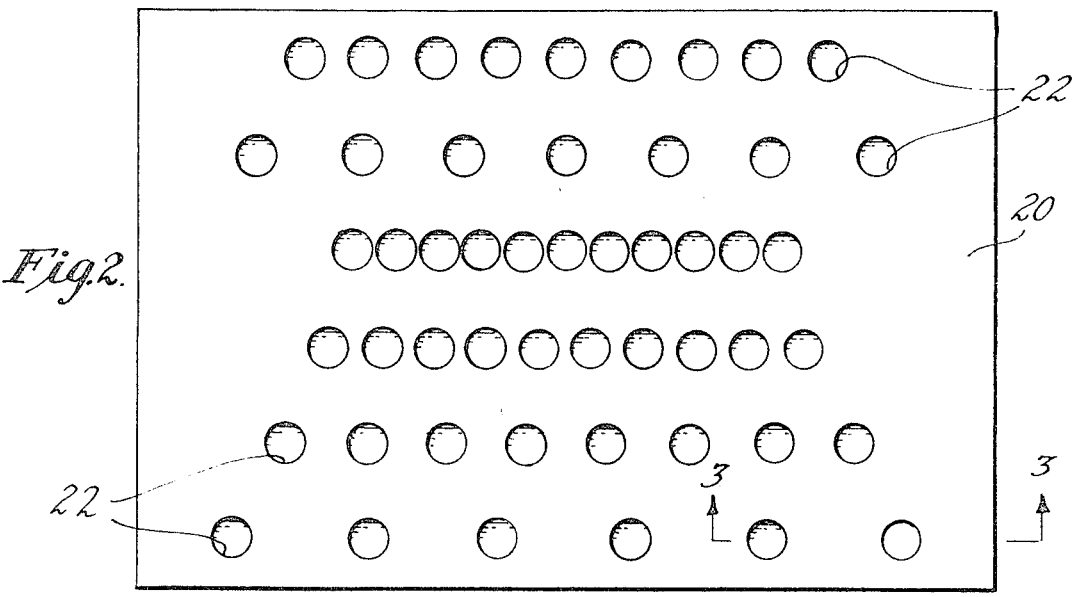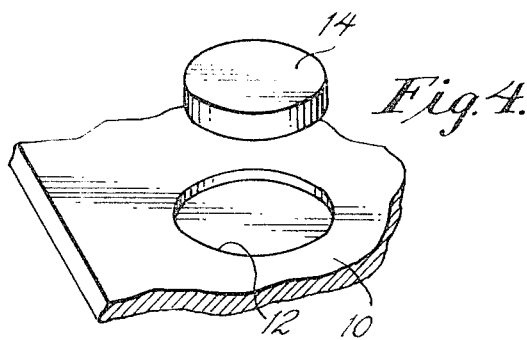

PATENTED AUG 3 1971

INVENTOR.
JANET ABBEY

AGENT.

EDUCATIONAL TEACHING AND TESTING DEVICE

This invention relates to an education device, and more particularly relates to method and means employing manipulable means for teaching and evaluating the intellectual and perceptual development of children.

The process of intellectual development is conceived as a succession of conceptual structures coming into equilibrium. One of the most important transitions in cognitive development is the acquisition of various conservations, that is, the cognition that certain properties, e.g., quantity, number, length, etc. remain invariant in the face of certain transformations of space.

Jean Piaget, best known as a developmental psychologist but also philosopher, logician, and educator, is one of the most remarkable figures in contemporary behavioral science. For more than 40 years he and his associated have been constructing, in bits and pieces, broad and highly original theory of intellectual and perceptual development. Piaget defines four stages in the evolution of a conservation. Stage 1 is characterized by focusing upon one stimulus dimension only. In stage 2, the other dimension is fixated. Vacillation between the two occurs in stage 3, but no coordination occurs. Stage 4 is the step of reconciliation of opposites. The conservation of number may be used as an example. If candies are spread out in two rows of equal number, but different lengths, the question can be asked, "Which row has more candy?" Until the conservation of number has become a stable cognitive structure, the child may focus first on the density of the candies, and then on the length, choosing one row as being more than the other. When conservation of number stabilizes, the child knows that they are the same no matter what additional transformations are made.

The educational implications are diversified. If conservation of number is not a stable cognitive structure, than the teaching of rote counting addition, subtraction, etc. is relatively meaningless, and consists of verbal knowledge only. The child cannot make his own generalization from a perception to the verbalization of that perception. He cannot proceed sequentially on his own. He is robbed of the chance to make his own discovery, to experience insight, to say "Ah Hah!"

Most experimental research had been concerned with the attempt to teach the concept of conservation (weight, mass, volume, number, space, etc.,) to the child. The efforts to do this experimentally have been exceptionally unsuccessful. Only support has been found for the Piagetian position that maturation in the cognitive sense is the necessary condition for conceptual understanding.

In the past, educators have attempted to teach concepts by explaining the concept to their students enumerating in what ways things are alike and/or different and by posing a hypothetical question to the pupil.

It is therefore an object of the present invention to present the problem perceptually to enable the child to solve the problem perceptually without instructions from the teacher.

Through play and manipulation the child will make the discovery of conservation of number.

A second object is the provision of a means for evaluating a child's ability to conceptualize (reconcile appearing opposites) by silent and noncritical observation.

The above objects as well as others together with the benefits and advantages of the invention will be apparent upon reference to the description sent forth below, particularly when taken in conjunction with the drawing annexed hereto and which:

FIG. 1 illustrates a plan view of one embodiment of the invention;

FIG. 2 illustrates a plan view of a second embodiment of the invention of FIG. 1;

FIG. 3 is a fragmentary sectional view as taken along lines 3–3 of FIG. 2 looking in the direction of the arrow;

FIG. 4 is a fragmentary, exploded view, partly in section, of the invention;

Figure 5:
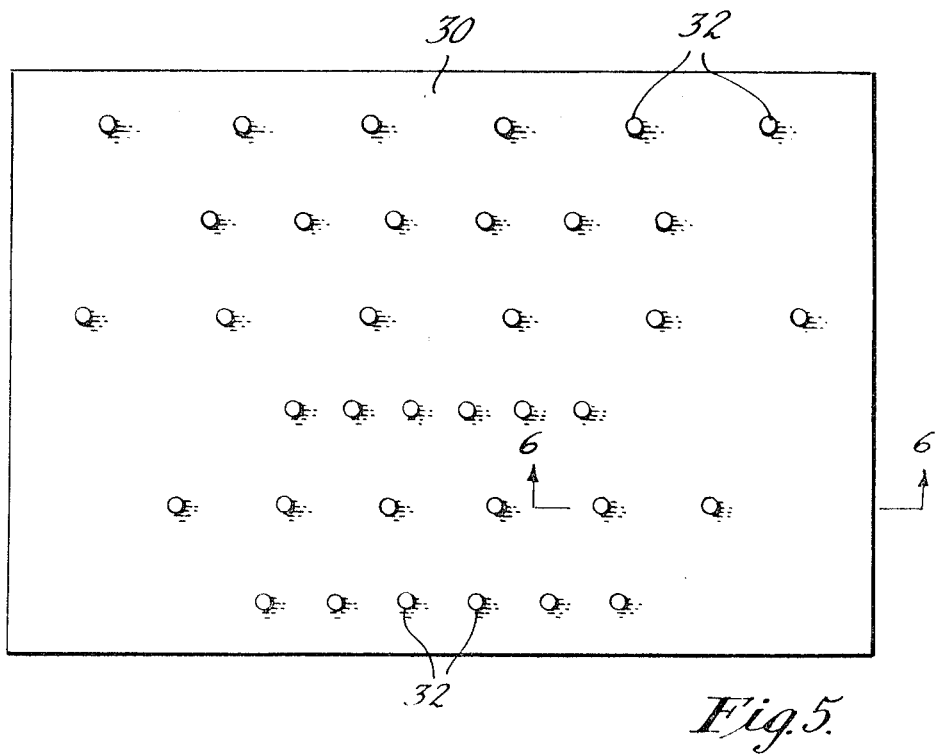
FIG. 5 illustrates a plan view of a third embodiment of the invention of FIG. 1.
Figure 7:
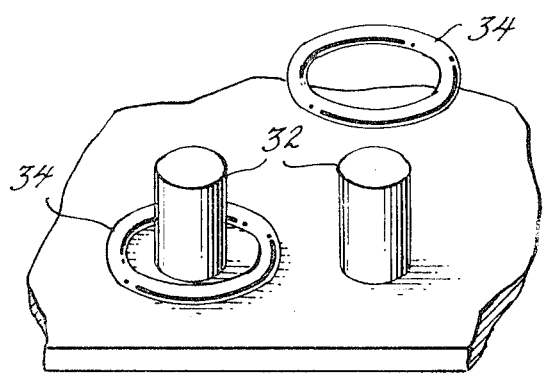
FIG. 7 is a fragmentary, exploded view, partly in section, of the embodiment of FIG. 5.

Referring now to the drawings, wherein like reference characters designate like or corresponding parts throughout the several views, there is shown in FIGS. 1 and 4, a board 10, which may be made of wood or any suitable material, having a plurality of rows of spaced means or circular recesses 12. The circular recesses are each adapted to receive an object or circular disc 14 of which a plurality will be provided, at least one for each recess shown.

As can be seen in FIG. 1, each row of circular recesses 12 contains a different number of circular recesses 12, while all rows are of the same length.

FIGS. 2 and 3 illustrates an embodiment of the board 10 of FIGS. 1 by providing a board 20 similar to the board 10 but which has rows of circular recesses 22 of different lengths. The discs 14 can also be inserted in recesses 22.

Figure 6:
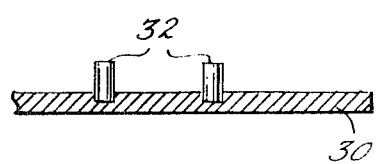
FIG. 6 is a fragmentary sectional view as taken along lines 6–6 of FIG. 5 looking in the direction of the arrow.

As can be seen in FIGS. 5 and 6 a third embodiment of the invention of FIG. 1 illustrates the arrangement of having different lengths of rows but where the number of spaced means are the same. This embodiment also illustrates the use of a board 30 having pegs 32 therein as the spaced means and rings 34 as the plurality of objects, as aforestated. This board 30 could also use spaced recesses and circular discs just as the boards 10 and 20 could be constructed utilizing pegs and rings.

It should also be understood that other configurations or designs could be used rather than the rows of objects, for example, groups of objects such as circles, each having a plurality of spaced means could be used. The spaced means could also be other than circular recesses and pegs but could also be square-shaped recesses, rectangle-shaped recesses, etc. The array could also be presented in three dimensions as well as the two dimensional presentation described herein.

In operation, each child is presented with the above-mentioned materials in the same way as he is given other toys such as blocks, paints, etc. The child explores the possibilities of the boards and materials without adult intervention, by himself and/or with others in his peer group. Games may be made up and rules for playing same, by the members of the group.

Obviously many modifications and variations of the present invention are possible in light of the above teachings. It is therefore to be understood, that within the scope of the appended claims, the invention may be practiced otherwise than as specifically described.

I claim:

1. A device for teaching and evaluating the intellectual and perceptual development of children including;
    a spacial area divided into a plurality of spaced rows,
    each of said rows containing a plurality of spaced means,
    the spacing between the means within a row being equal,
    the spacing within each row being different from the spacing within each other tow, and
    a plurality of objects each adapted to mate with said spaced means.

2. A device of the type described in claim 1 wherein each spaced row is of the same length and contains a different number of spaced means therein.

3. A device of the type described in claim 1 wherein each spaced row of spaced means is a different length and contains a different number of spaced means therein.

4. A device of the type described in claim 1 where each spaced row of spaced means is of a different length and contains the same number of spaced means therein.

5. A device of the type described in claim 1 wherein said spaced means includes spaced recesses.

6. A device of the type described in claim 1 wherein said spaced means includes spaced pegs.

7. A device of the type described in claim 1 wherein said plurality of objects includes a plurality of discs.

8. A device of the type described in claim 1 where said plurality of objects includes a plurality of rings.